US012669207B2

(12) United States Patent
Trombatore

(10) Patent No.: US 12,669,207 B2
(45) Date of Patent: Jun. 30, 2026

(54) QUICK-FIT CONNECTION ASSEMBLY

(71) Applicant: Giuseppe Trombatore, Rosolini (IT)

(72) Inventor: Giuseppe Trombatore, Rosolini (IT)

( * ) Notice: Subject to any disclaimer, the term of this patent is extended or adjusted under 35 U.S.C. 154(b) by 187 days.

(21) Appl. No.: 18/008,371

(22) PCT Filed: Jul. 5, 2021

(86) PCT No.: PCT/IB2021/056008
§ 371 (c)(1),
(2) Date: Dec. 5, 2022

(87) PCT Pub. No.: WO2022/009070
PCT Pub. Date: Jan. 13, 2022

(65) Prior Publication Data
US 2023/0279895 A1 Sep. 7, 2023

(30) Foreign Application Priority Data

Jul. 6, 2020 (IT) ......................... 102020000016222

(51) Int. Cl.
*F16L 41/14* (2006.01)
*F16B 2/08* (2006.01)
*F16B 39/32* (2006.01)
*F16B 43/02* (2006.01)

(52) U.S. Cl.
CPC ................ *F16L 41/14* (2013.01); *F16B 2/08* (2013.01); *F16B 39/32* (2013.01); *F16B 43/025* (2013.01)

(58) Field of Classification Search
CPC .......... F16B 39/32; F16B 2/08; F16B 43/025; F16L 41/14; F16L 41/005; F16L 41/12; F16L 41/10; F16L 41/088
USPC ......................................................... 285/206
See application file for complete search history.

(56) References Cited

U.S. PATENT DOCUMENTS

| | | | | |
|---|---|---|---|---|
| 1,973,170 A * | 9/1934 | Jacobi | ..................... | F16B 9/054 |
| | | | | 403/194 |
| 4,405,159 A * | 9/1983 | Spelber | ................... | F16L 41/14 |
| | | | | 285/236 |
| 6,508,490 B1 | 1/2003 | Hoffman | | |
| 7,597,361 B2 * | 10/2009 | Theilen | ................... | F16L 41/14 |
| | | | | 285/139.2 |
| 2008/0030021 A1 | 2/2008 | Theilen | | |
| 2009/0208309 A1 * | 8/2009 | Engelbrecht | ............ | F16B 39/32 |
| | | | | 29/505 |
| 2015/0078862 A1 * | 3/2015 | Zhu | ......................... | F16B 39/32 |
| | | | | 411/384 |

* cited by examiner

*Primary Examiner* — David Bochna

(57) ABSTRACT

Quick-fit connection assembly not affected by accidental rotations during the installation due to the presence of an innovative connecting element (1) which has, in the threaded external region, one or more sliding tracks (3) suitable for engaging with the nosepiece (91) of a corresponding washer (9).

12 Claims, 17 Drawing Sheets

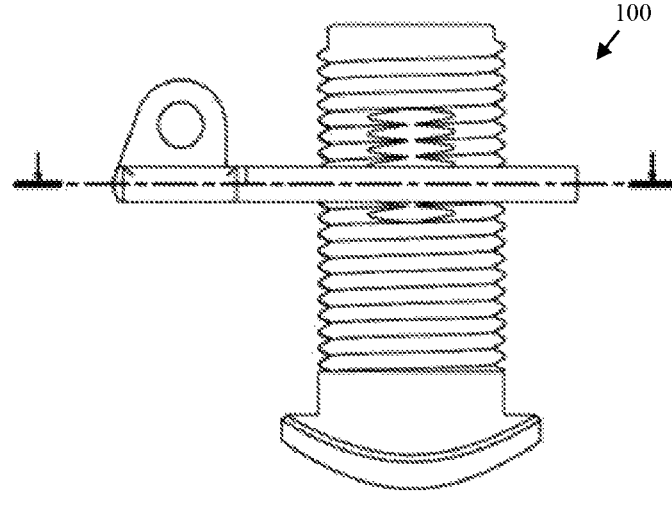
FIG. 16
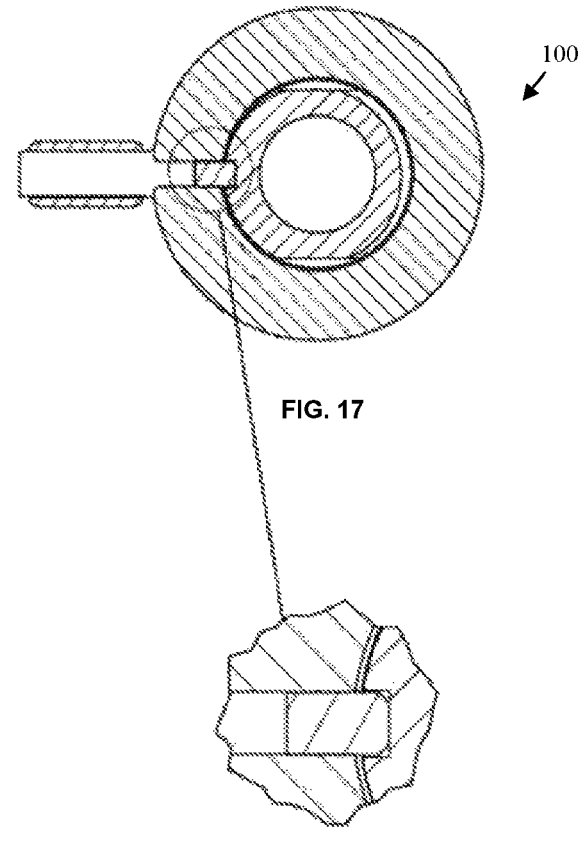
FIG. 17
FIG. 18

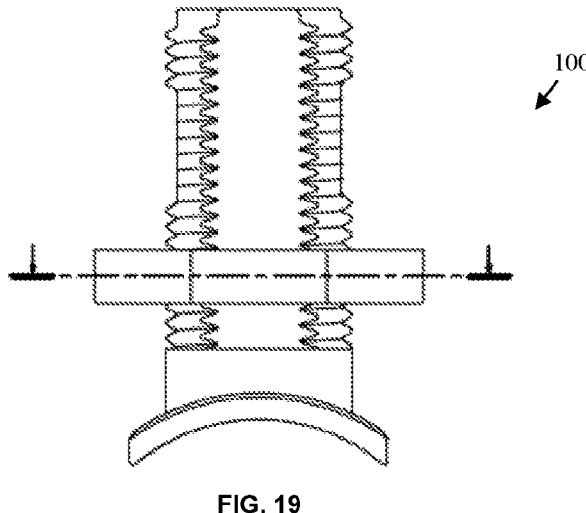
100
FIG. 19
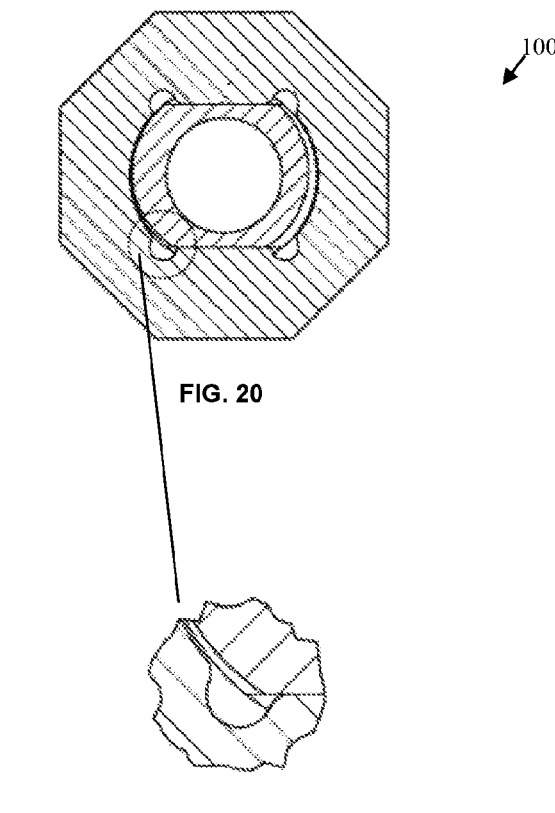
100
FIG. 20
FIG. 21

100

100

100

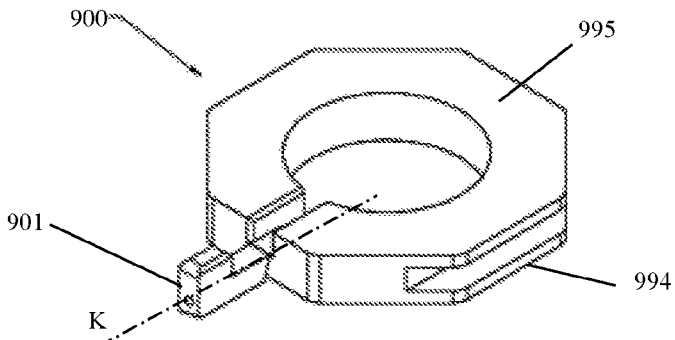
FIG. 35
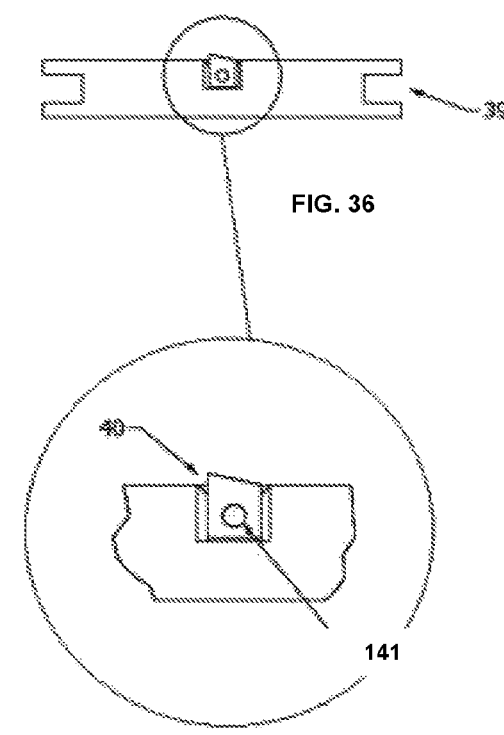
FIG. 36
FIG. 37
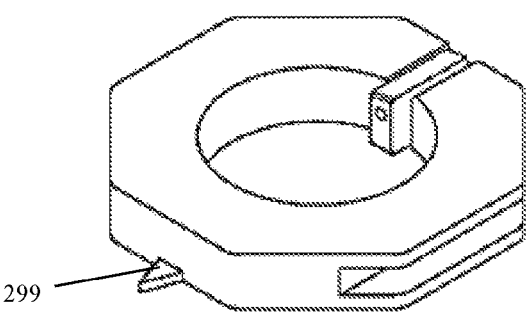
FIG. 38

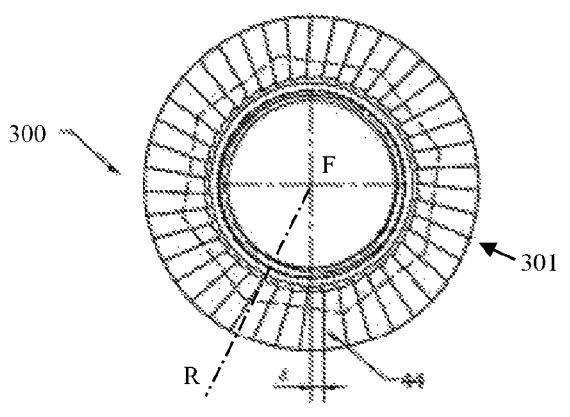
300
F
301
R
FIG. 39
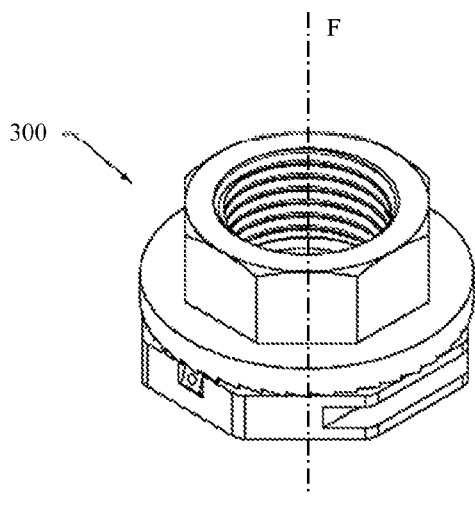
300
45
FIG. 40
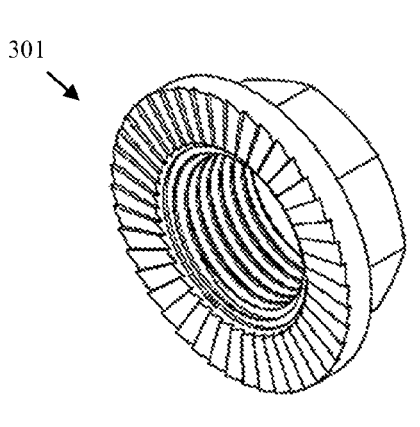
301
FIG. 41
F
300
FIG. 42

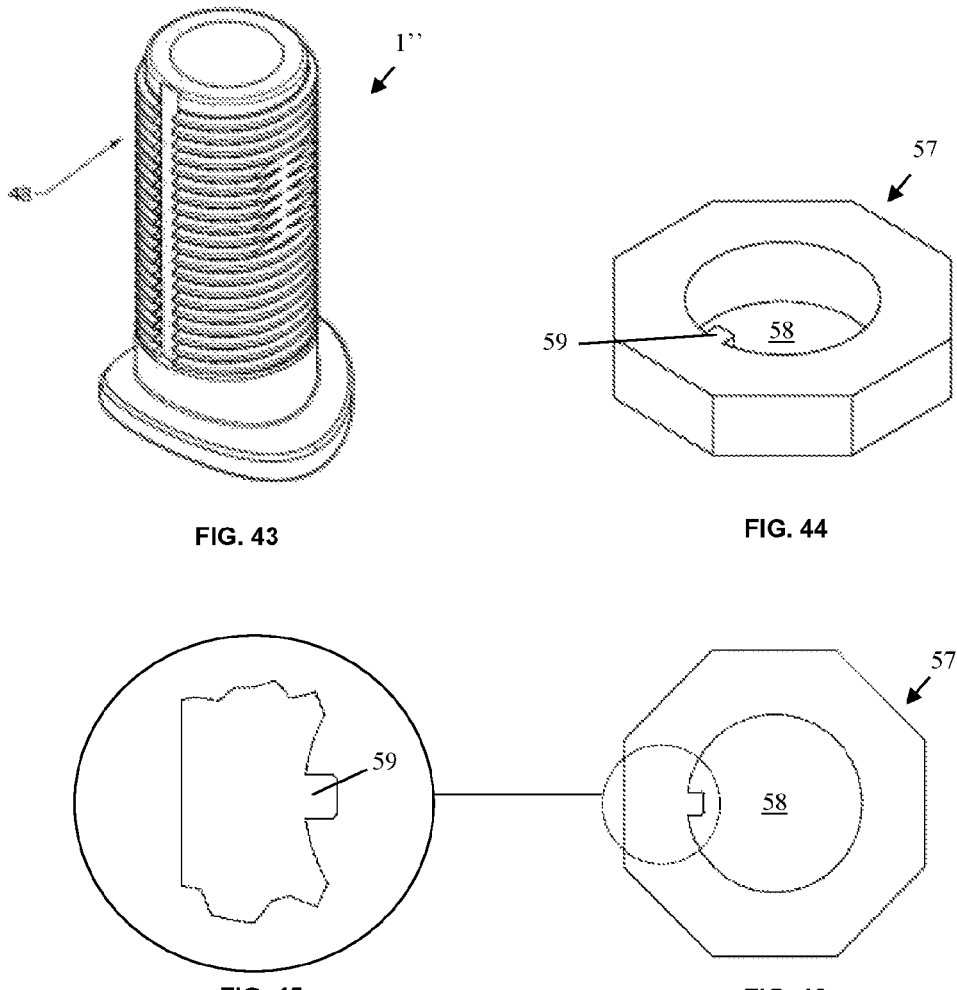
FIG. 43
FIG. 44
FIG. 45
FIG. 46
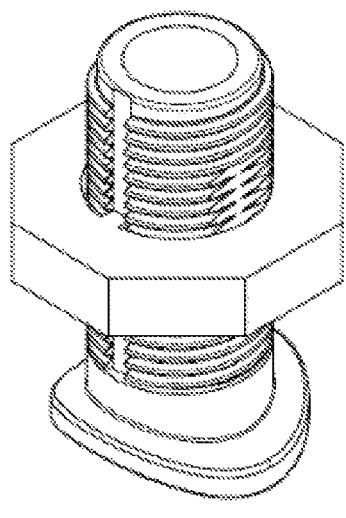
FIG. 47

QUICK-FIT CONNECTION ASSEMBLY

TECHNICAL FIELD OF THE INVENTION

The present invention relates to the mechanics' sector, in particular to the hydraulics' sector, and relates to a quick-fit connection assembly equipped with anti-rotation means.

The assembly is configured to be easily installed on both flat and curved walls.

BACKGROUND

In the hydraulic field, there is often the need to connect two rooms separated by a wall, in order to allow fluid sealed passage through the wall itself. This happens for example when it is desired to connect the internal compartment of a tank with an external conduct.

The aforementioned hydraulic communication is established by obtaining a special seat in the wall and installing a connection assembly at such seat.

Traditionally employed connection assemblies comprise an externally threaded and tubular shaped connecting element.

The aforementioned assemblies further comprise two ring nuts, in order to block the connecting element from opposite sides of the wall. Such locking provides the interposition, between each ring nut and the wall, of a cup packing.

In order to install such a connection assembly, it is first required inserting the threaded connecting element through the connecting seat. To this purpose, the latter has a passage opening with transversal dimensions equal to or slightly higher than those of the connecting element, although smaller than the transversal dimensions of the two ring nuts. Then, each ring nut is screwed onto the connecting element, until the relative cup packing is tightened against the respective face of the wall.

The prior art connection assemblies described above have some important drawbacks. The main drawback consists in the fact that the friction between the seals and the external wall to be derived is exploited for tightening. Disadvantageously, this operation is effective only when using flat walls and very soft cup packings, which limit the application of the connection system for low pressure applications.

A further inconvenience occurring during the installation of the connections consists in the fact that, from the outside, the operator has no visual reference to assess whether the installation has been carried out correctly or not. Consequently, the incorrect installation of the connection becomes apparent from the outside only during the testing of the system, causing substantial intervention costs to re-install the incorrectly arranged components, although without any guarantee that this intervention will have the desired effect.

At present, it is not possible to block the threaded connecting element and proceed to tighten it manually or by screwing means, as the external threaded portion, which remains projecting with respect to the wall of the conduct or tank in which the connecting element is inserted, is generally reduced to a few millimetres, and the remainder is fully engaged with, or covered by, other components—as shown for example in FIG. 25, wherein a connection assembly according to the present invention is shown, installed on a pipe.

This configuration is commonly adopted because the more the external thread has a reduced extension, the more the rigidity of the connecting element is increased, with the greater possibility of avoiding accidental breakage. In fact, the more the external threaded region is extended, the greater the flexion that the connecting element can endure. An accidental impact could therefore cause it to break with consequent blocking of the implant.

Intending to use high pressure connections or connections for flat or curved walls, solutions have been proposed wherein the connection assembly comprises seals with weakening grooves. However, despite the friction present between the contact surfaces, such solutions are not suitable for ensuring to correctly tighten the connection on the wall. Furthermore, at high pressures it is necessary to use seals with a hardness higher than those used for low pressures, and this causes a considerable increase in the tightening torques necessary to deform the seal in order to position it in a sealing position. A consequence of this phenomenon is the inability to install the connection on the wall.

SUMMARY OF THE INVENTION

The technical problem being the basis for the present invention is to provide a connection assembly which allows to obtain improved performances with respect to the known art, overcoming the above mentioned drawbacks.

This objective is achieved by means of a connecting element as defined in independent claim 1, a washer according to independent claim 9 and a connection assembly comprising the connection assembly and the washer.

Preferred features of the present invention are the subject of the dependent claims herein enclosed.

According to a first aspect, the present invention provides a connection assembly not liable to accidental rotations during installation thanks to the presence of an innovative tubular connecting element which has, in an external threaded region, one or more sliding portions or tracks suitable for engaging with a projecting element borne by a corresponding washer, also the same being part of the present invention.

According to preferred aspects of the invention, the sliding portion can be shaped like a groove, or like a more extended and substantially flat region, obtained by the absence of material from the external tubular profile of the connecting element. In any case, the sliding portion is shaped to couple with the nosepiece of a corresponding innovative washer, also the subject of this patent application.

The cooperation between the washer, in particular its nosepiece, and the connecting element, allows to block the latter when inserted into the conduct or wall of the tank to be connected, in such a way as to avoid undesired mutual movements (e.g. rotations).

According to a further preferred aspect of the invention, the innovative washer has an external "pin" bearing a terminal end portion provided with the nosepiece, the pin being configured to assume an operating configuration, in association with the aforementioned connecting element, wherein the nosepiece engages in abutment on sliding portion of the latter.

The washer, after being coupled to the connecting element, can in turn be blocked by means of additional external bodies applicable thereto, completely avoiding the rotation of the connecting element and therefore of the entire connection assembly with respect to the conduct or wall which is applied thereto. Thereby, it will be ensured that the derivation of fluid from the affected conduct or wall will take place correctly, without no chance of error.

A further advantage achieved by the presence of the washer with nosepiece in the connection assembly of the invention consists in the possibility of assembling the connection, already installed onto the wall of a conduct or tank, with other components that will be screwed there onto without the need to use key sockets, and thus without weakening the structure of the threaded body.

Other advantages, characteristics and methods of use of the present invention will become apparent from the following detailed description of several embodiments, presented by way of non-limiting example.

BRIEF DESCRIPTION OF THE FIGURES

Reference will be made to the attached Figures, wherein:

FIGS. 16 and 17 respectively show a side view and a plan view of an embodiment of a connection assembly according to the present invention, wherein the washer is in operating configuration;

FIG. 18 shows a detail of FIG. 17;

FIGS. 19 and 20 respectively show a side view and a plan view of a variant of connection assembly according to the present invention, wherein the washer is in operating configuration;

FIG. 21 shows a detail of FIG. 20;

FIGS. 35 and 36 respectively show a perspective view and a front view of an even further embodiment of a washer according to the present invention;

FIG. 37 shows a detail of FIG. 36;

FIG. 38 is a further perspective view of the washer of FIG. 35, with pin in operating position;

FIGS. 39 and 41 respectively show a plan view and a perspective view of a preferred embodiment of a tightening nut according to the present invention;

FIGS. 40 and 42 respectively show a side view and a perspective view of the tightening nut of FIG. 39 coupled with the washer of FIG. 35;

FIG. 43 shows a perspective view of a further preferred embodiment of a connecting element according to the present invention;

FIGS. 44 to 46 show an even further preferred embodiment of a washer according to the invention;

FIG. 47 shows the coupling between the connecting element of FIG. 43 and the washer of FIGS. 44-46.

DETAILED DESCRIPTION OF PREFERRED EMBODIMENTS

Figures 1, 2, 3, 3A:
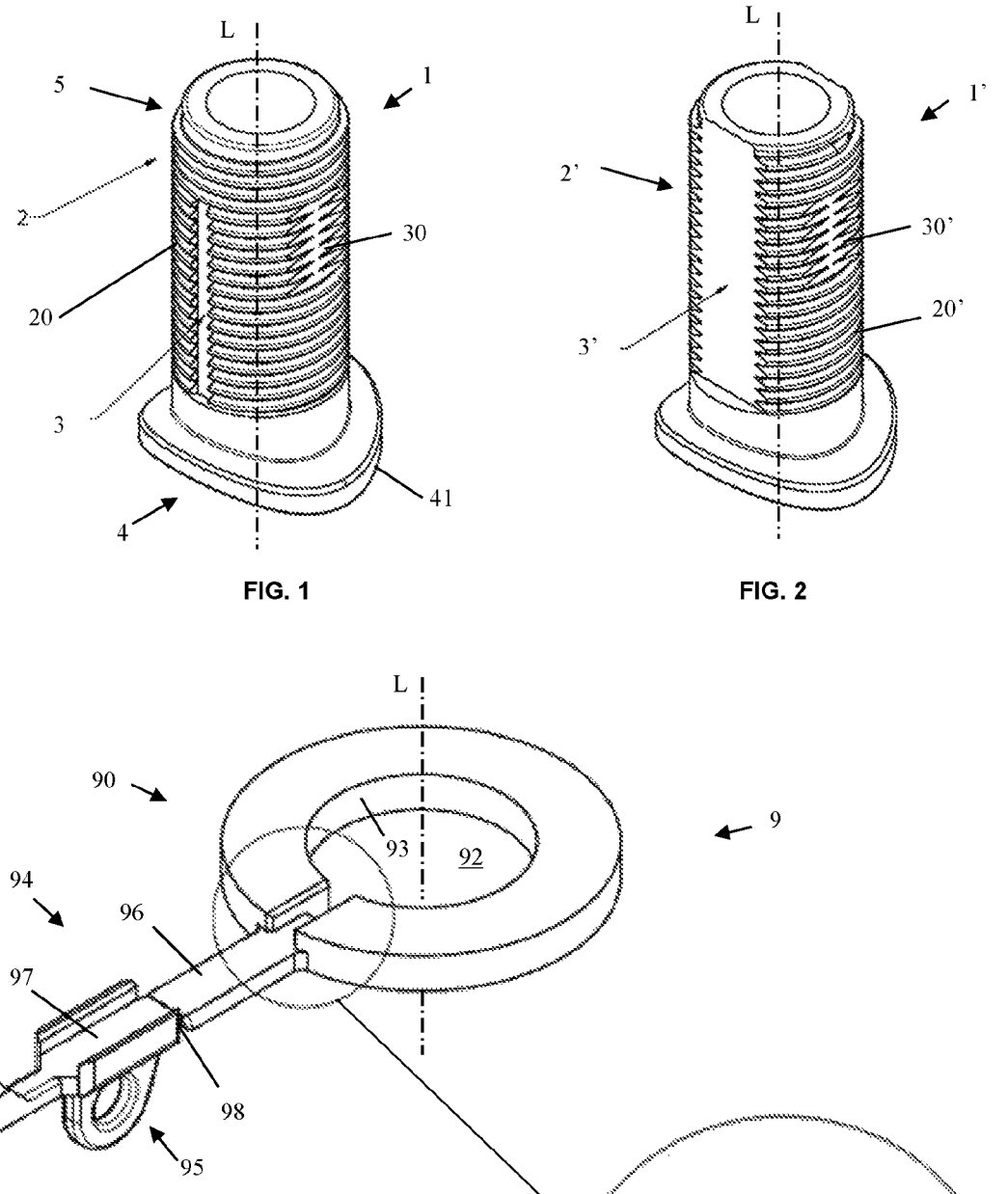
FIG. 1 shows a perspective view of a first preferred embodiment of a connecting element according to the present invention.
FIG. 2 shows a perspective view of a second preferred embodiment of a connecting element according to the present invention.
FIG. 3 shows a perspective view of a first preferred embodiment of a washer according to the present invention.
FIG. 3A shows a detail of FIG. 3.
Figure 4:
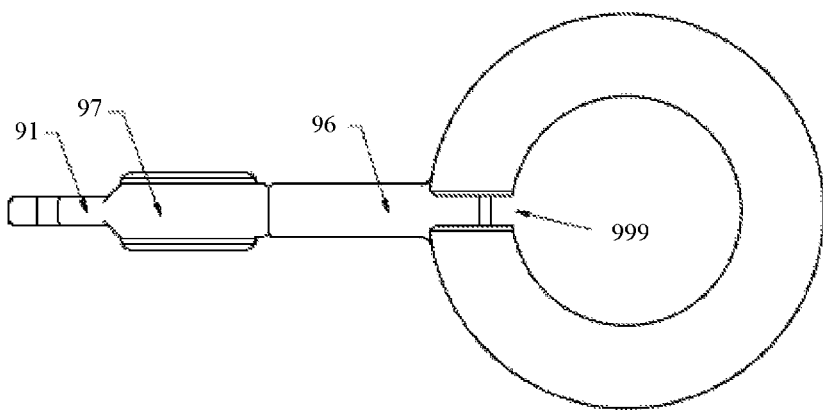
FIG. 4 shows a plan view of the washer of FIG. 3, with pin in rest configuration.

With initial reference to FIG. 1, a first embodiment of a connecting element according to the present invention is overall denoted by 1.

Figure 24:
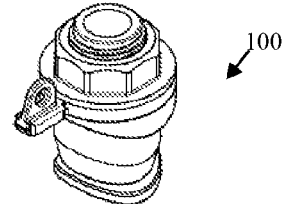
Figure 25:
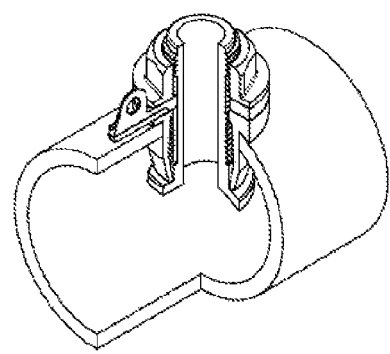
FIG. 25 shows, in section, the assembly of FIG. 24 installed on a conduct.

The connecting element 1 is apt to be used as part of a connection assembly according to the present invention, as shown by way of example in FIG. 24. The connection assembly of the invention allows to realize the fluid sealed passage through a wall, for example of a conduct or tank. In particular, the connection assembly of the invention is configured to be installed in a stable, quick and correct manner even in high pressure conditions of the fluid to be derived.

The connecting element 1 is configured to mechanically couple with an innovative washer comprised within the connection assembly of the invention, in such a way as to cooperate with the washer to achieve a high stability coupling, and which favours a quick and correct installation of the connection assembly.

The connecting element 1 comprises a main body 2 which has an overall tubular conformation, preferably with a circular cross-section, apt to allow the passage of a fluid. The main body 2 extends according to a main direction of longitudinal development L, and has a first terminal end portion 4 and a second terminal end portion 5, mutually opposite along the aforementioned main direction of longitudinal development L.

Such first and second terminal end portions 4, 5 respectively comprise an inlet and outlet section of the fluid to be derived through the connection assembly of the invention, when in use.

At the first terminal end portion 4, the main body 2 can comprise a flange element 41, intended to be coupled with a cup packing inserted on the connecting element 1 to realize the seal of the connection assembly itself when it is inserted into the wall of the conduct or of the reservoir from which the fluid is to be derived.

The main body 2 comprises a lateral external surface 20 which has a curved development, depending on the tubular shape of the main body 2 itself, and is at least partially threaded. According to preferred embodiments of the invention, the surface 20 is fully threaded, i.e. it is threaded from the terminal first end portion 4 up to the second terminal end portion 5. Alternatively, the thread may stop before the second terminal end portion 5, realizing a terminal portion of the external surface without thread, preferably substantially cylindrical.

According to a first advantageous aspect of the present invention, the external surface 20 comprises a first region 3 wherein the thread is absent. In particular, the first region 3 is circumscribed within the first external surface 20. Preferably, the portions of the external surface 20 adjacent to the first region 3, or rather surrounding the first region 3, are threaded.

According to an advantageous aspect of the invention, the first region 3 is shaped to realize a guide or sliding track, and therefore comprises one or more flat walls, achievable by removing one or more portions of thread or by molding.

The first region 3 has an at least partially flat extension according to the main direction of longitudinal development L, in other words preferably parallel to the aforementioned direction L.

According to the embodiment shown in FIG. 1, the first region 3 can be shaped like a groove, or a slit, which preferably develops according to the main direction of longitudinal development L. Even more preferably, the first region 3 extends from the first terminal end portion 4, up to about half, or %, the longitudinal extension of the external surface 20. The remaining portion of the external surface at the second terminal end portion 5 can be completely threaded, in order to ensure greater resistance of the connecting element 1 and greater sealing and resistance on the threads of any additional components that can be screwed, in use, on the connecting element 1. In other words, the first region 3 does not extend along the entire length of the external surface 20.

Thereby the terminal part of the connection can be coupled with other fitting connections to the pipes.

In addition, the thread affects the entire terminal portion of the external surface 20, allowing the use of Teflon tape and avoiding leakage on the thread, because the operator can always use the same Teflon reel even if working on connections of different sizes. Basically, the diameter of the coupling flat washers between the various pieces does not constrain.

Alternatively, the first region 3 can extend from the first terminal end portion 4 up to the second terminal end portion 5, i.e. for the entire length of the external region 20 along the longitudinal direction L.

Furthermore, the first region 3 can have a greater width with respect to the very small one typical of a groove, in particular being shaped like a real flat wall of the outer region 20.

In particular, the first region 3 is configured in such a way as to create a coupling seat with a corresponding nosepiece of an innovative washer, also the same being part of the present invention.

To this purpose, the washer comprises a through hole defined by an internal surface configured to engage with the aforementioned external surface 20 of connecting element 1, as will be described in more detail below.

The variant of connecting element 1', shown in FIG. 2, comprises in particular a first region 3' which extends along the entire length of the external region 20' along the longitudinal direction L, and is shaped like a flat wall.

In general, the connecting element 1, 1' can comprise further regions of external surface 20, 20' that are without thread, and have a preferably reduced extension with respect to that of the first region 3, 3'.

For example, as shown in FIGS. 1 and 2, there may be at least one second region 30, 30' of the external surface 20, 20' wherein the thread is absent, which has a flat extension according to the main direction of longitudinal development L.

In particular, the first region 3, 3' and/or any additional regions without groove 30, 30' can be obtained by eliminating or removing material from the main body 2, 2'.

Preferably, the first region 3, 3' and/or any additional regions without groove 30, 30' are set back with respect to the remaining extern to the surface 20, 20'. In other words, considering an embodiment wherein the main body 2 has an overall conformation substantially symmetrical with respect to an axis of longitudinal development L, these first regions 3, 3' and/or the further regions 30, 30' would result to be radially further set back (innermost) of the remaining external surface threaded 20, 20' with respect to the L axis, therefore closer to the L axis.

In other words, according to variant embodiments of the invention, the connecting element, in particular the threaded main body, has a longitudinal groove which serves as a sliding guide and as an anti-rotation wall for the connecting element itself. The threaded main body can be made by molding or chip removal, depending on the material which it is intended to be built therewith.

The sliding guide function consists in receiving a corresponding nosepiece element comprised onto the pin borne by an innovative washer according to the present invention, in such a way as to prevent the rotation of the connecting element, and therefore of the whole connection assembly, even when is affected by the tightening torques for installation. This solution assures the correct installation of a connection assembly which uses hard cup packings, resistant to high pressures or which is installed onto curved walls, regardless of the hardness or not of the cup packings used.

Figure 53:
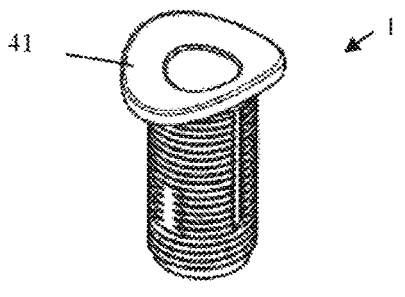
FIG. 53 shows a perspective view of a further preferred embodiment of a connecting element according to the present invention.
Figure 54:
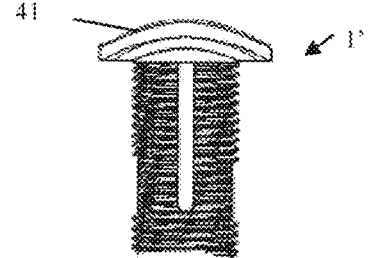
FIG. 54 shows a side view of the connecting element of FIG. 53.
Figure 55:
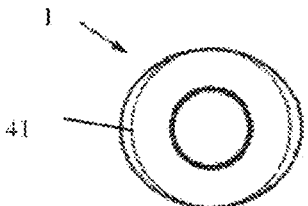
FIG. 55 shows a top view of the connecting element of FIG. 53.
Figure 56:
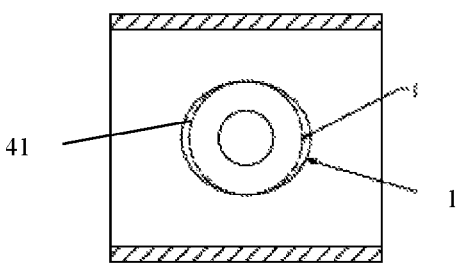
FIGS. 56, 57 and 58 are sectional views of an application of the connecting element of FIG. 53 applied to a conduct.
Figure 57:
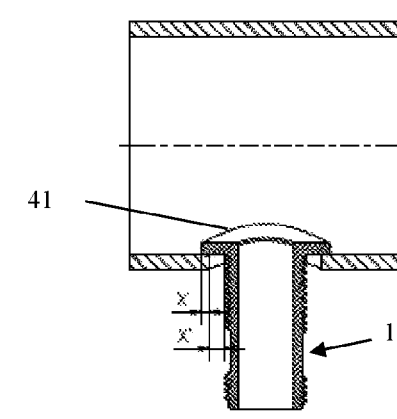
Figure 58:
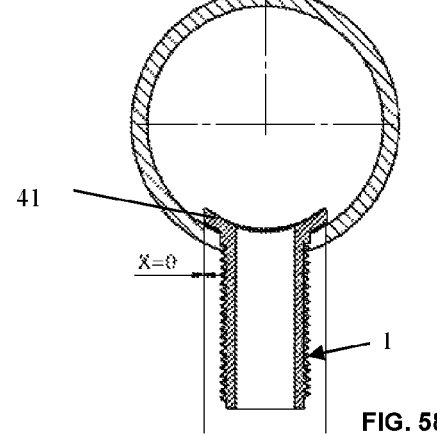

FIGS. 53-55 show a further variant of the connecting element 1, 1', while FIGS. 56 to 58 show an application of the connecting element of FIG. 53, 55 to a conduct.

With respect to the previous embodiments, the element 41 flange, apt to remain inside the conduct, has a double-curved development and also does not have an external profile with a circular plan, although with an oval plan. The double-curvature has concavity facing towards the second terminal end portion 5. For the sake of clarity, the profile of the flange 41 is oval when viewed according to a plane orthogonal to the main direction of longitudinal development L. The longer side of the oval must be arranged longitudinally to the conduct, the shorter one transversely, (see FIGS. 57 and 58 respectively).

The correct centering of the threaded body as well as the orientation will be adjusted by the cup packing and/or by the double-curved shaped washers that will be described below.

The oval double-curved flange 41 can pass through the through hole realized into the conduct since the cross section of the body has the same dimensions as the through hole or slightly smaller, while the longitudinal section, being longer with respect to the through hole, exploits the spaces X' to be inserted.

The dimensions of the oval will depend on the project requests.

The oval double-curved flange 41 increases the seal at high pressures by further realizing a rigid mechanical anchoring. Furthermore, it mitigates the deformations of the conduct adjacent to the bypass through hole caused by the overpressure.

If the hydraulic seal is no longer assured, for example due to the pressure considerably higher than the operating pressure declared by the supplier, or due to deterioration of the seals due to temperatures higher than the operating ones, or other reasons, the mechanical anchoring prevents the ejection of the connection from the conduct and limits the fluid leakage, increasing the user safety of the systems.

With reference to FIGS. 3 to 8, a first embodiment of an anti-rotation washer according to the present invention will now be described, overall denoted by 9.

According to a first advantageous aspect, when in use in the connection assembly of the invention, the washer prevents the rotation of the connecting element 1, 1' which is coupled thereto, thus preventing the rotation of the entire connection assembly.

The washer 9 comprises a main body 90, having an overall annular conformation and comprising a through hole 92, developing according to a longitudinal direction L which can be an axis of symmetry for the main body 90. According to a first embodiment of the washer 9, the latter has a circular plan, wherein the main body is shaped like a circular crown.

Substantially, the main body 90 can be shaped as a flat ring, preferably with circular geometry, in such a way as to serve as a bearing between a cup packing and an external tightening nut, which are also preferably parts of the connection assembly of the invention, avoiding the friction between the two bodies to block the advance of the connecting element towards the outside of the conduct or tank wall to be derived, to position itself in a sealing configuration.

Figure 26:
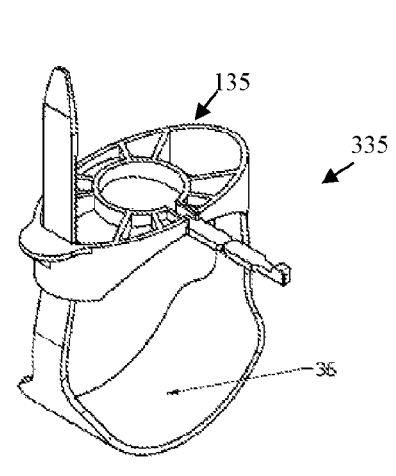
FIGS. 26 to 28 respectively show a perspective view, a side view and a front sectional view of a further embodiment of a washer according to the present invention.
Figure 27:
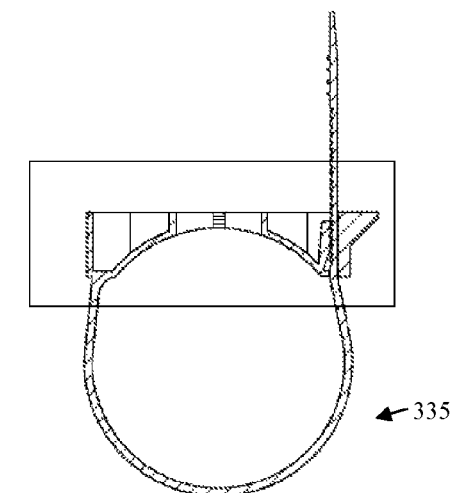
Figure 28:
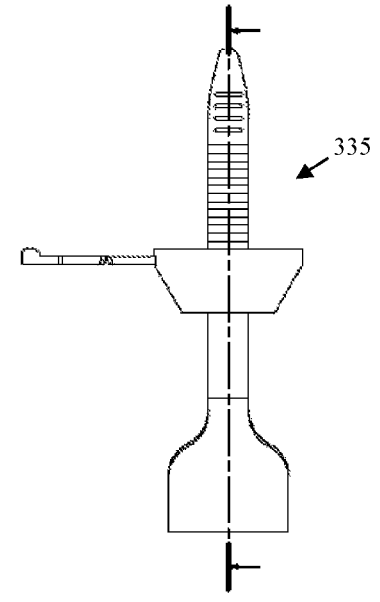
Figure 29:
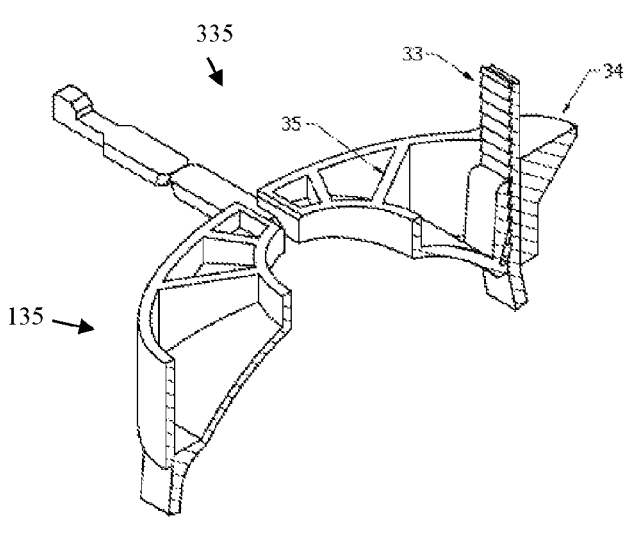
FIG. 29 shows a detail, in section, of the washer of FIG. 26.

The main body 90 can be strengthened by the presence of internal ribs, preferably with radial development (as for example in the embodiment shown in FIG. 26).

With reference to FIG. 38 (although the following is to be considered applicable to any embodiment of washers according to the present invention), at an external surface of the main body which is not engaged during the installation of the connection assembly and which will remain visible in use, can there must be at least one direction indicator 299, for example in the shape of an arrow, to indicate whether the positioning of the connection assembly is correctly performed (generally, the connection assembly must be positioned along a generatrix of the pipe to be connected). Generally, there are placement lines on the exterior surfaces of pipes. By aligning the indicator or direction indicators to the line on the external surface of the conduct to be connected, the positioning will result to be visually correct.

With further reference to FIGS. 3 to 8, preferably the proportions of washer 9 are such that the thickness of the latter, measured along the L direction, is the smallest dimension with respect to its length and width measured on a plane orthogonal to the direction L.

The through hole 92 is defined by an internal side surface 93 of the main body 90, which is suitably configured to engage with the external surface 20, 20' of a connecting element 1, 1', according to what has already been described.

The washer 9 according to the present invention comprises interference means 94 configured to assume: a rest position, wherein it is, or rather it extends up to, a maximum distance from the main body 90, and an operating position, wherein it interferes at least partially with the through hole 92.

Furthermore, the interference means 94 is configured to engage with the external first region 3, 3' of the connecting element 1, 1', while the internal side surface 93 from the through hole 92 of the washer 9 is configured to engage with the external surface 20, 20' of the connecting element 1, 1', in particular with the thread.

In particular, interference means may comprise an interference element, identifiable by the same numerical reference 94, with a preferably elongated conformation, preferably projecting with respect to the main body 90 and even further preferably having a main development direction orthogonal to the longitudinal direction L. In particular, this main development direction is coincident or parallel to a development direction in width or length of the main body 90, where the aforementioned length and width are measured on an orthogonal plane in the direction L.

The interference element 94 has a central region 98 connected or connectable at an its own first end portion to the main body 90, in particular to an external side surface of the main body 90, while it bears a nosepiece element 91 at its own second end portion.

The nosepiece 91 is configured to engage with the first region 3, 3' external to the connecting element 1, 1'. The nosepiece element 91 is preferably provided with a free end portion, intended to engage with the first region 3, 3', which has bevelled or preferably rounded edges, to prevent sliding jamming on the bottom of the first region 3, 3' and to compensate for the machining tolerances.

Preferably, the projecting element 94 has a substantially rectilinear development. Even further preferably, the projecting element 94 extends substantially on a plane orthogonal to the longitudinal direction L when the nosepiece 91 is in the rest configuration and/or in the operating configuration.

According to a preferred variant, the central region 98 has a folding portion facilitated, in such a way that it can be folded up to carry the nosepiece 91 from a rest position, wherein it is at a maximum distance from the main body 90, to an operating position, wherein it interferes at least partially with through hole 92.

Preferably, the washer 9 can be realized in a single body comprising the main body 90 and the interference element 94, in order to avoid the management of several elements during the storage and assembly phase, as well as to save production costs by realizing a single mould for the realization of the piece.

The realization in a single body further has the advantage of allowing quick coupling of the connection assembly, as the interference element 94 results to be, already in rest position, correctly connected to the main body. Furthermore, this configuration allows an automated assembly of the connection assembly, which is simpler and therefore cheaper.

According to preferred variants of the washer 9, the interference element 94 may instead be movably connectable to the main body 90, for example it may be realized as a separate element from the main body 90, selectively connectable to the latter, for example by interlocking. According to this variant, the main body 90 has a seat shaped to couple with the first end portion of the interference element 94. Preferably, the seat is realized as a through opening that completely interrupts the annular development of the main body 90, as shown in the detail of FIG. 3A, wherein the conformation of the main body 90 is open loop.

Furthermore, a variant of the main body 90 may provide the presence of a connecting wall between the two free end portions of the main body 90, at the seat for coupling with the interference element 94. A wall realized according to what has been described, which therefore makes the conformation of the main body of the washer closed-loop, while corresponding to an annular portion of minimum thickness with respect to the rest of the main body, is denoted by 999 in FIG. 4.

Figure 9:
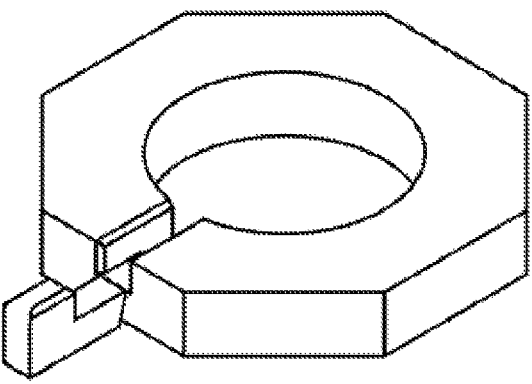
FIG. 9 shows a perspective view of a second preferred embodiment of a washer according to the present invention, wherein the pin is in rest configuration.
Figure 10:
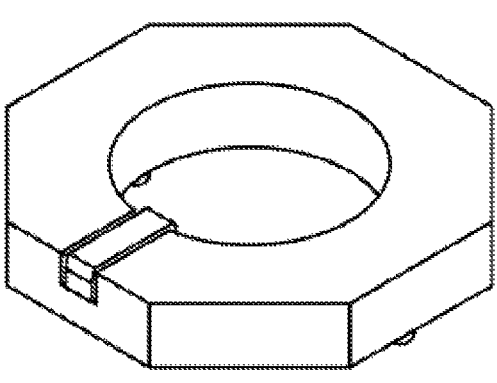
FIG. 10 shows a perspective view of the washer of FIG. 9, wherein the pin is in operating configuration.
Figure 11:
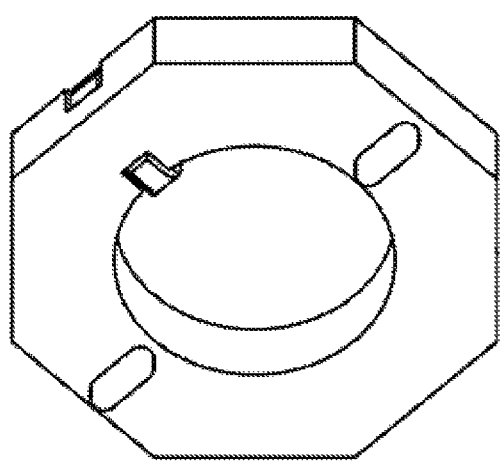
FIG. 11 shows a bottom perspective view of FIG. 10.

As a further alternative, the seat for the nosepiece can be obtained on the main body 90 without interrupting the continuity of its annular shape (e.g. FIGS. 9-11). For example, the seat can be shaped as a groove realized at a top or bottom surface of the main body. Preferably, the seat has bevelled edges 21, 22, as shown in FIG. 3A.

In particular, with reference to FIG. 3, the interference element 94 may comprise a first and a second portion 96, 97, between which the folding portion facilitated 98 is interposed. The configuration is such that, when the first portion 96 is connected to the main body 90, the second portion 97 can be folded over the first 96, preferably until the second portion 97 abuts the first 96, to carry the nosepiece 91 in operating position. In other words, the central region 98 may comprise a first portion 96 connected to the nosepiece 91 at a free terminal end portion, and a second portion 97 connected or connectable to the main body 90, wherein such first and second portion 96, 97 are mutually connected at the folding portion facilitated 98, so that the first portion 96 can be tipped over the second portion 97 to carry the nosepiece 91 in operating position.

Figure 6:
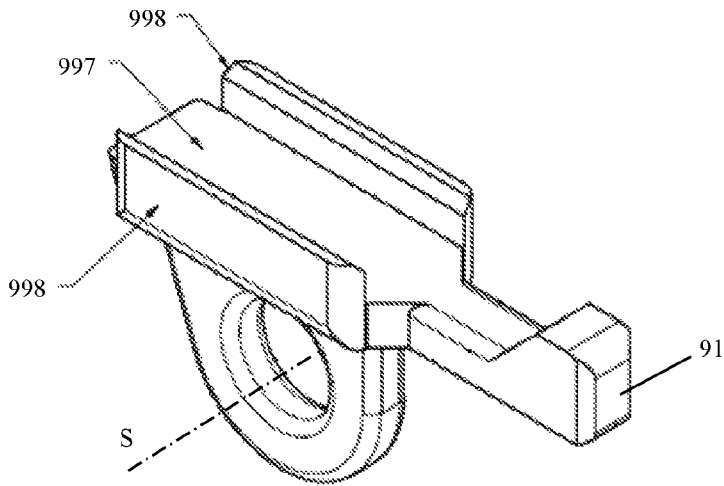
FIG. 6 shows an enlarged and inverted perspective view of the pin of the washer of FIG. 5, in an operating configuration.

In particular, as shown in FIG. 6, the second portion 97 can have two side walls or flaps 998 projecting and opposite with respect to a central surface 997 of the portion 97 itself, which develop parallel to each other along the external perimeter of the portion 97. The fins 998 are arranged so that, when the interference element is in an operating configuration and the second portion 97 is folded over the first portion 96, the first portion 96 is interposed, or inserted, between such fins.

Furthermore, the fins 998 preferably have an internal bevel necessary to avoid jamming with the second portion 96 during the assembly phase.

Figure 5:
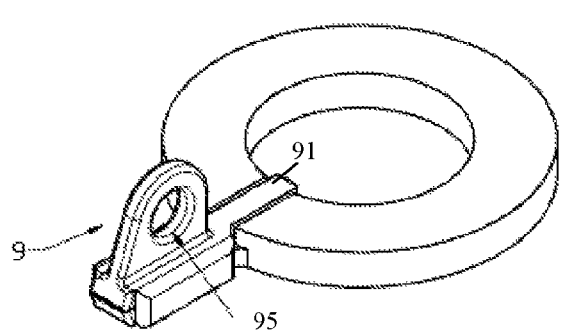
FIG. 5 shows a perspective view of the washer of FIG. 4, with pin in operating configuration.

As shown by way of example in FIGS. 5 and 6, the operating position of the nosepiece 91 may provide the latter to be inserted in the same seat of the main body 90 within which the first portion 96 is inserted, and which projects with respect to the same seat to interfere within the through hole 92, in order to be able to engage with the connecting element 1,1' when the latter is inserted inside the washer 9.

Figures 7, 8:
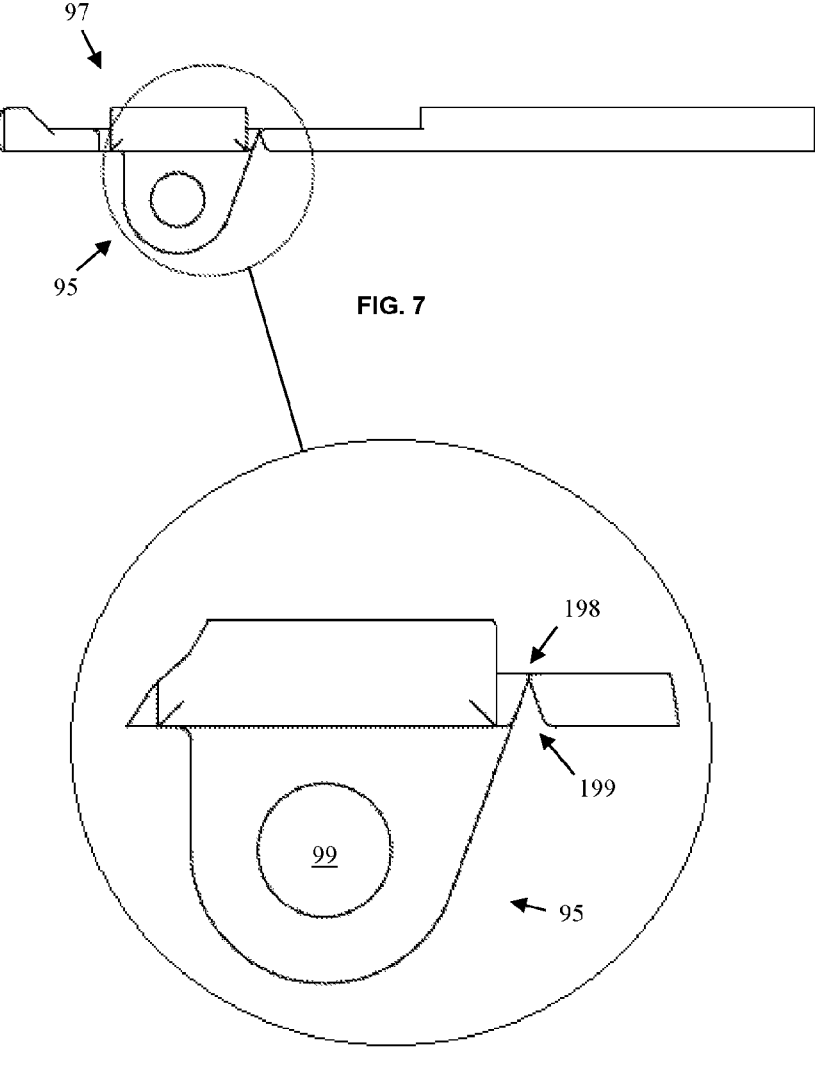
FIG. 7 shows a side view of the washer of FIG. 3, with pin in rest configuration.
FIG. 8 shows an enlarged detail of FIG. 7.

With reference to FIGS. 7 and 8, in order to facilitate the manipulation by the operators, the washer 9 can comprise operating means 95 at the second portion 97. The operating means 95 can be shaped like a buttonhole or eyelet, in other words it can comprise a through hole 99 within which the operator can place a finger. Preferably, the through hole 99 develops according to a direction S orthogonal with respect to the longitudinal direction L when the nosepiece 91 is in the operating position, as shown in FIG. 6.

In particular, the operating means 95 can comprise a portion, wherein the eyelet is obtained, which has a reduced thickness with respect to the maximum thickness of the interference element 94, where the thickness is intended to be measured along the direction S, shown in FIG. 6.

Advantageously, the presence of operating means facilitates the extraction of the connecting element from the conduct or wall following maintenance or other. In addition, the same eyelet, in the case of installing the connection assembly on conducts, can be used to be crossed from side to side by a fastening strap which is wrapped around the conduct and tightened thereto. In this case, the washer will oppose the tightening torque without the need for further measures, by means of the clamp fixed to the conduct.

Preferably, all the edges of the operating means 95 are suitably bevelled or rounded in order to avoid injury to the operator's hands, so that they can be effectively used to manually oppose the tightening torque.

A further variant embodiment of the pin and the respective washer according to the invention is shown in FIGS. 48 to 51. The further embodiment of washer is overall denoted by 119, and has operating means 195 which has an increased thickness with respect to the variant described above. In particular, the operating means 195 has a thickness equal to that of the entire portion of the interference element 194 at which it is arranged, to increase the resistance of the component itself.

With reference to FIG. 8, it is possible to see how the folding portion facilitated comprises, or preferably consists of, a hinge 198, apt to allow the mutual rotation of the portions 96 and 97. The hinge 198 is realized by means of a thin layer of deformable material, where in particular the thickness of the hinge portion 198 is at least ten times lower than that of the adjacent portions 96 and 97, indeed to allow its deformability. Although the folding portion 198 facilitated is thin, according to the shown embodiment, the continuity of the material between the two portions 96 and 97 is assured. In particular, an angled notch 199 at which there is a shortage of material, in order to create the aforementioned reduced thickness hinge 198, can be seen.

Preferably, in order to more effectively prevent undesired rotation of both the washer and the connection assembly once installed, the washer is required to be held in position through a force equal to and opposite to the tightening torque. An external wall of operating means offers a privileged point of application of this strength. The wall has to be held in position by means of a specially made wrench or simply by grabbing the same by fingers. It should be understood that the length of the first portion 96 of the interference element 94, and consequently of the second portion 97, is as much great as the tightening torque applied (as known, with the same force applied, by increasing the distance between the two portions, the torque which in this case opposes the rotation increases) is great.

With reference to FIGS. 9 to 11, 14, 15, and 35 to 38, further embodiments of the washer of the invention are shown, which differ from the one previously described because they have in plan—i.e. on a plane orthogonal to the longitudinal direction L of development of the through hole—a section of overall polygonal, in particular octagonal, geometry with regards to the external profile of the main body. Preferably, the external profile of the washer according to a view on the plane orthogonal to the longitudinal direction L of development of the through hole is octagonal. With regards to the through hole, the latter has circular geometry because, as anticipated, it is intended to accommodate the connecting element 1, 1'. Alternatively, the through hole may have a square or polygonal geometry apt to insert into a counterpart which is also polygonal and devoid of threads or partially threaded at the top.

Figure 14:
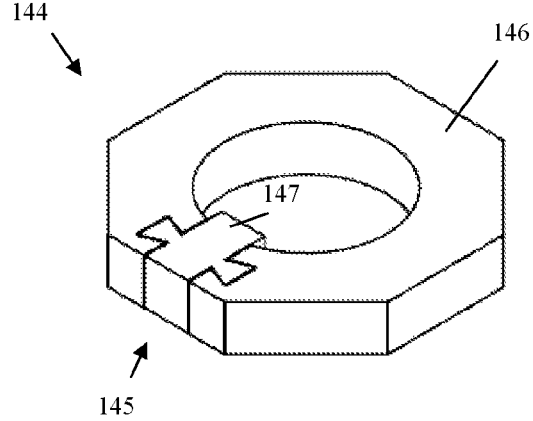
FIG. 14 shows a perspective view of a fifth preferred embodiment of a washer according to the present invention, wherein the pin is in operating configuration.
Figure 15:
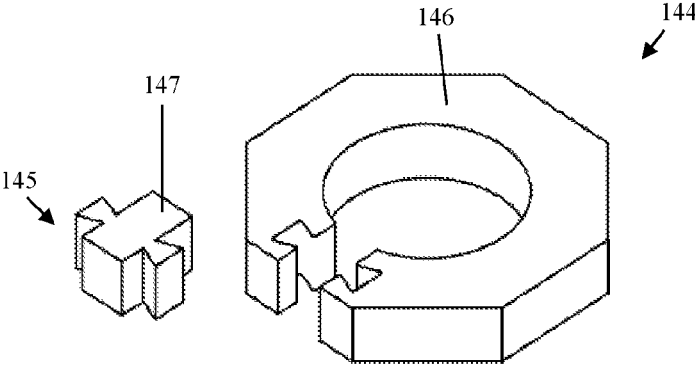
FIG. 15 shows a perspective view of FIG. 14, wherein the washer is in rest configuration.
Figure 22:
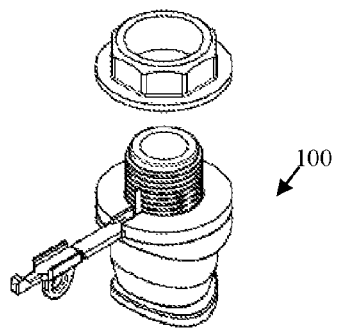
FIGS. 22 to 24 respectively show perspective views in sequence of the installation of a connection assembly according to the present invention.
Figure 23:
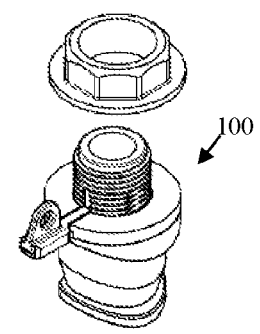

With particular reference to FIGS. 14 and 15, a preferred embodiment of the washer 144 is shown, comprising an interference element 145 which has a cross conformation, preferably with two dovetail arms, when viewed in plan, wherein the cross has a main central element and two side flaps. Thereby, a dovetail joint whose parts are constrained further under the action of the tightening torque is achieved. The nosepiece 147 is realized by means of a terminal end portion of the main central element of the cross. According to this variant, the interference element 145 is completely removable with respect to the main body 146 of the washer and, when it is inserted in the seat obtained on the main body of the washer, i.e. when it is in operating position, its external surfaces are arranged to continue the extension of the external surfaces of the main body of the washer, to realize a closed annular shape. In such configuration, the only exception, or discontinuity in the extension of the surface of the main body 146, occurs at the nosepiece 147 of the interference element, which results to be projecting with respect to the internal side surface of the main body 146, occupying part of the through hole in the washer.

With reference to FIGS. 35 to 38, a variant of washer 900, with an octagonal plan, is shown. The washer 900 has a track 39 obtained at the external side surface of the main body, shaped like a groove, a slit or a moulded groove. The aforementioned track is comprised within the upper surface 995 and lower surface 994 of the main body of the washer, which are mutually opposite and preferably parallel, and develops according to a direction orthogonal to the axis of the through hole within the main body. Such track 39 realizes a key grip for a dedicated tool, not represented.

The washer 900 comprises interference means according to what has already been described, in comparison to a particular conformation of the nosepiece element 901. The nosepiece 901 is shaped in such a way that, once inserted inside the corresponding seat, a portion thereof projects with respect to the main body of the washer itself, to actually realize a wedge or pin 40. In particular, the wedge 40 may bear a through hole 141, developing according to a longitudinal direction K of the interference means 901, which is orthogonal to the axis of the through hole comprised in the washer itself (see FIG. 35).

The through hole 141 allows the removal of interference means 901, when realized as a separate body from the main body of the washer, for maintenance or other interventions, by means of a dedicated tool.

In particular, the wedge 40 has a variable thickness configuration, preferably with a flat profile developing in an oblique or inclined direction with respect to the upper or lower surface of the main body of the washer, wherein the portion of the wedge 40 projecting with respect to the main body is that corresponding to a maximum thickness.

The configuration of the wedge 40 is such as to prevent the rotation of the tightening nut shown in FIGS. 39 to 42, which could be favoured by the vibrations present in the machines where the coupling has been installed, or by water hammer in the pipes. Inadvertent rotation of the tightening nut may cause a decrease in the tightening torque, and therefore an abnormal operation of the installed component.

The preferred embodiment of the tightening nut, shown in FIGS. 39-42, is overall denoted by 300.

The tightening nut 300 has a main body shaped like a traditional nut, provided with a threaded through opening for engagement with a corresponding connecting element. The nut 300 further has a portion of flanges connected thereto at an upper or lower face of the main body, mainly extending in the orthogonal direction to the axis of the through hole F in the main body of the tightening nut 300. According to the embodiment shown, the flange has, at an external annular surface 301 thereof which faces in the opposite direction with respect to the main body of the nut, several teeth 44, to form a preferably completely indented surface. The teeth 44 are parallel to each other according to a plane displaced by a predefined distance with respect to the axis of the through hole F.

According to the preferred embodiment shown, the teeth are each arranged to have an inclination, preferably constant, with respect to a perfectly radial direction R. In particular, the profiles of the teeth are parallel to a plane passing through the axis F and 'shifted' with respect thereto, i.e. displaced with respect thereto, by a fixed value "δ" (offset value "δ"). Furthermore, the teeth have a flat but sloping external surface, in particular complementary to the sloping surface of the wedge 40.

The number of teeth, the inclination of the same (corresponding to that of the wedge, as well as the projection of the wedge itself with respect to the main body of the washer) and the number of teeth under grip are factors which depend on the torques involved, and are therefore dimensioned by the person skilled in the art according to the same.

The aforesaid configuration is such that the flat and inclined walls of the profiles of a tooth of the tightening nut 300 and of the wedge 40 are complementary, to achieve a stable coupling between the two components. This, together with the tightening torque applied in creating the washer-tightening nut-connecting element coupling, prevents undesired unscrewing of the assembly.

Preferably, the coupling between the wedge 40 and the tooth of the tightening nut 300 is achieved by means of a contact between the two components which is established along the entire length of the tooth, not only in one point.

Figure 12:
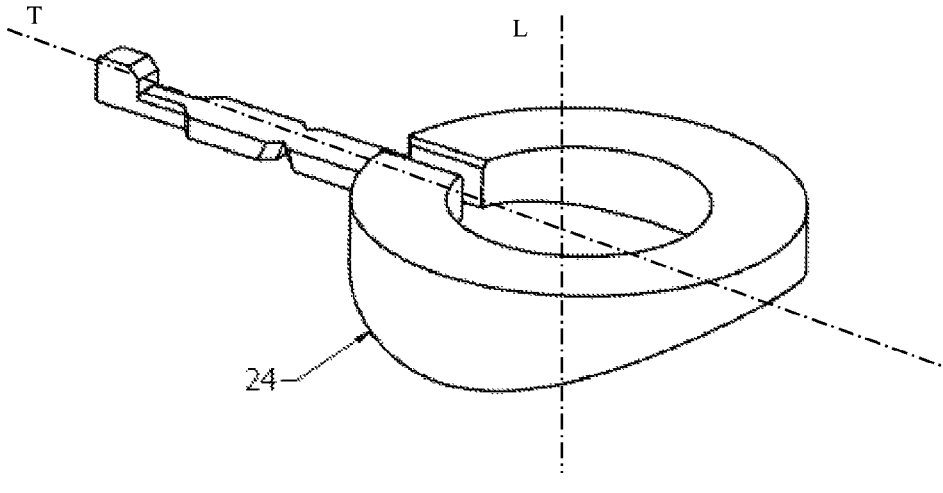
FIG. 12 shows a perspective view of a third preferred embodiment of a washer according to the present invention, wherein the pin is in rest configuration.
Figure 13:
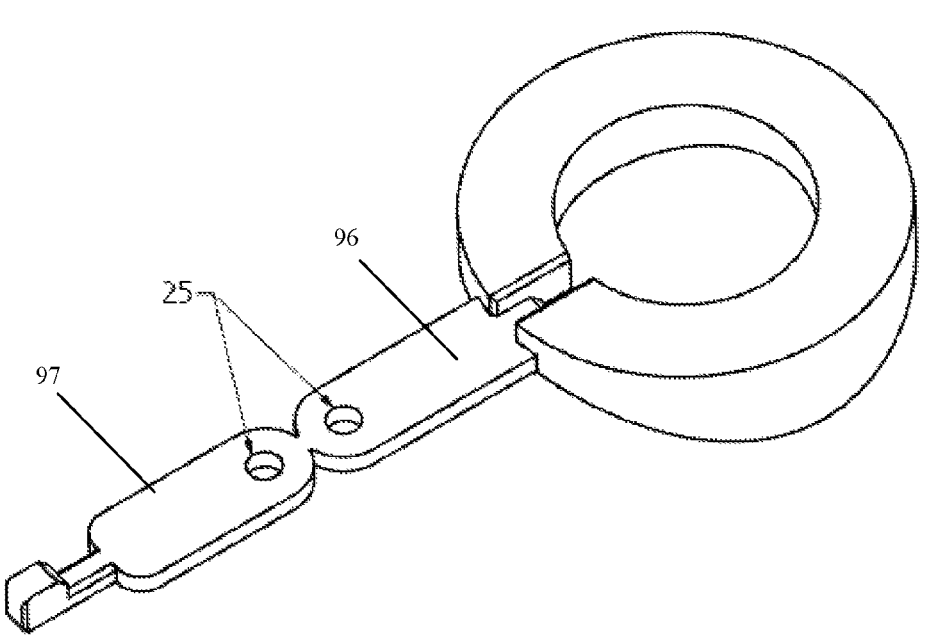
FIG. 13 shows a perspective view of a fourth preferred embodiment of a washer according to the present invention, wherein the pin is in rest configuration.

FIGS. 12 and 13 show a third preferred embodiment of the washer of the invention, which has a main body with variable thickness along the longitudinal direction L. In particular, the main body 90 comprises an upper and/or lower annular surface 24 which has a concave double-curved development, preferably in the form of a saddle. Such configuration preferably provides that the thickness of the main body decreases as the distance from a longitudinal development axis T of the interference element (which is an axis preferably orthogonal to the longitudinal axis L of the through hole in the main body) decreases, considering a configuration wherein the latter is in an operating position. In other words, the thickness of the main body is smaller at the portion of the main body where the seat for coupling with the interference element is borne, and in the portion of the main body diametrically opposite to such seat.

Preferably, the first and second portions 96, 97 may have a respective through hole 25. Said through holes may be arranged so that, after the two portions have been overturned one on the other for the transition into the operating configuration, they overlap in order to realize a single through hole. A self-tapping screw designed to be fixed on the conduct or wall to be derived, to further oppose the rotation of the connection assembly, can be inserted into the single through hole.

This device can be used for joining walls made of plastic (self-tapping screw) or concrete (screw anchors), with a thickness of a few cm.

With reference to FIGS. 26 to 34, a further embodiment of a washer 335 according to the invention is illustrated, wherein the main body 135 comprises a band connecting element 36, shaped in order to adapt to the profile and dimensions of a conduct whereon the connection assembly is implanted, in order to further stabilize the coupling. The connecting element 36 is configured to realize a mechanical connection, in particular to circumscribe, 'embrace' or 'wrap, a conduct whereon the connection assembly is installed. The band connecting element 36 has for this purpose a first terminal end portion thereof connected to the main body of the washer and a free second terminal end portion thereof. Alternatively, the terminal end portions may be free and constrained in the same way by the indentation or other means. In both cases, the wrapping action is necessary to strengthen the conduct whether the latter is made of deformable material. The main body 135 of the washer 335 is further provided with corresponding locking means, for example configured as a buckle, to block the free terminal end portion of the band connecting element 36 in a position wherein it is securely wrapped around the conduct to be connected. In particular, the terminal end portion 33 of the band connected means 36 can have an indented surface, apt to couple with the corresponding buckle borne by the washer 335 and further bearing a corresponding indentation, in order to improve the stability of the locking.

Furthermore, the main body 135 of the washer may comprise three ribs 35 to increase its stiffness.

Figure 30:
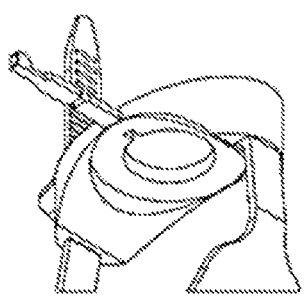
FIGS. 30 and 31 respectively show a partial perspective view of further preferred embodiments of a washer according to the present invention, with pin in rest position.
Figure 30:
Figure 31:
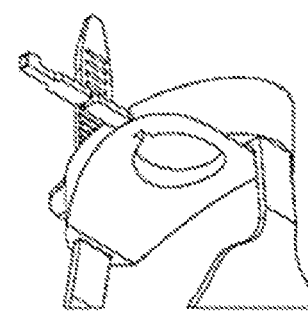

FIGS. 30 and 31 show further variants of the washer described above, wherein the main body is shaped in such a way as to have a more or less high thickness at the central opening.

The present invention further provides a connection assembly comprising a washer and a connecting element, as already described. An example of this assembly is shown by way of example in FIGS. 16 to 21 and 33, 34, which further allow to appreciate the clearance created between the connecting element and the respective washer once the mutual coupling has been established.

Figure 32:
FIG. 32 shows a cup packing for connection assembly compatible with a connection assembly according to the present invention.
Figure 33:
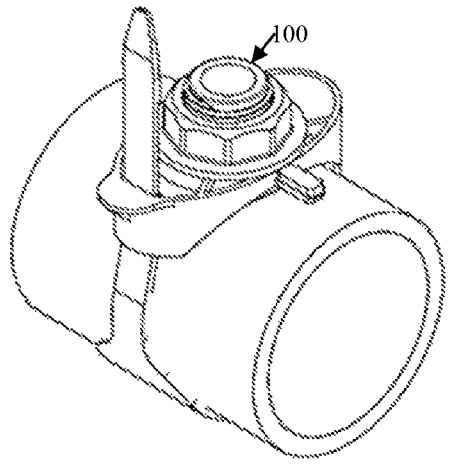
FIGS. 33 and 34 respectively show a perspective view and a sectional perspective view of a variant of a connection assembly according to the present invention.
Figure 34:
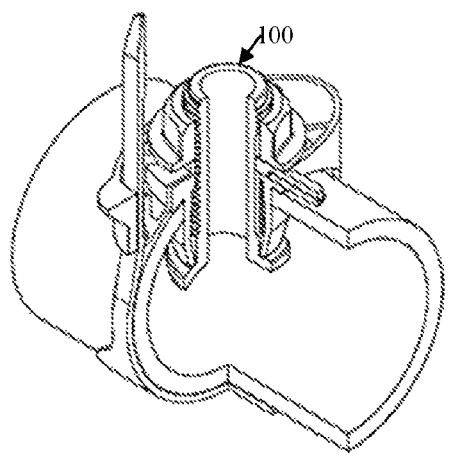
Figure 48:
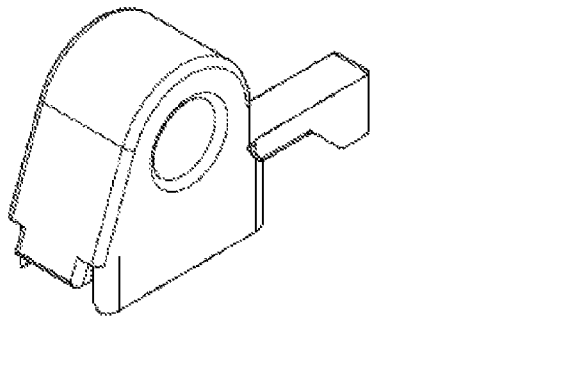
FIGS. 48 to 50 respectively show two perspective views and a side view of an even further preferred embodiment of a pin according to the invention.
Figure 49:
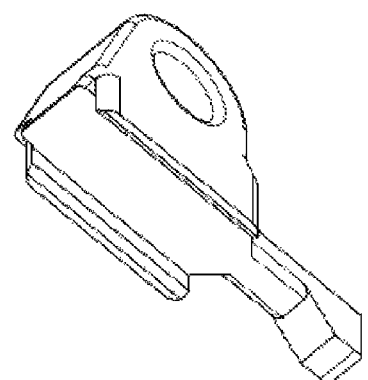
Figure 50:
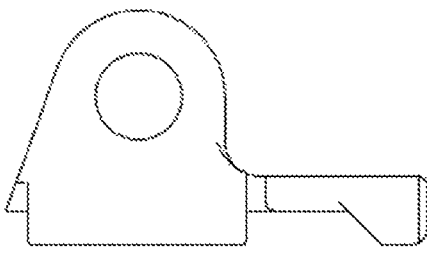
Figure 51:
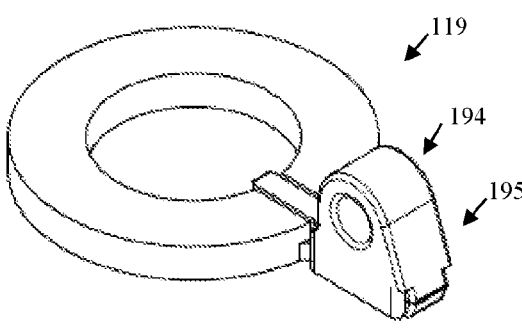
FIG. 51 shows a perspective view of an even further preferred embodiment of a pin according to the invention, comprising the pin shown in FIGS. 48-50.

In particular, FIG. 32 shows a cup packing also preferably comprised in the connection assembly of the invention, apt to couple with the connecting element and being arranged, in use, at the opening section of the conduct or tank where the connection assembly is installed.

For the sake of clarity, in FIGS. 22 to 25, a preferred embodiment of a connection assembly according to the present invention is further illustrated, according to installation sequences on a conduct.

Substantially, all the components of the connection assembly of the invention (among which the connecting element and the washer) are sized on the basis of the torque of tightening and opposition to the rotation to which they will resist.

With reference to this, it can be provided that an anti-rotation washer according to the invention comprises more than one interference element, and in such case the respective connecting element would bear corresponding seats for their engagement.

Figure 52:
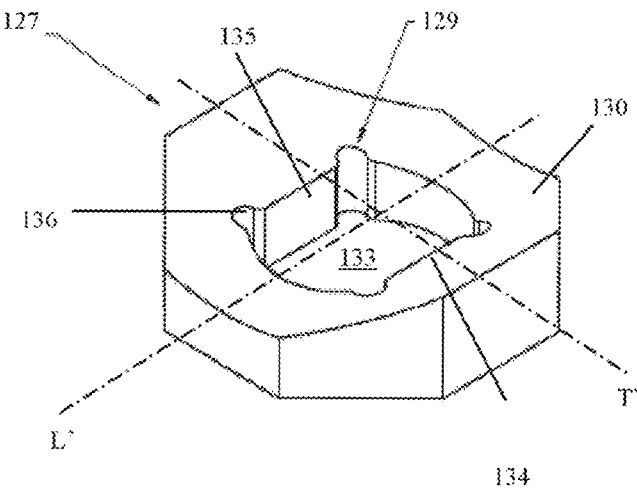
FIG. 52 shows a perspective view of an even further variant embodiment of the washer according to the present invention.

In FIG. 52, a variant of the washer of FIG. 9 is shown, with an octagonal plan, overall denoted by the numerical reference 127. The washer 127 has a main body comprising an upper and/or lower annular surface 130 having a double-curved concave development, preferably in the form of a saddle. Therefore, the thickness of the main body is variable, in particular it will be possible to identify two pairs of portions of main body, for example each pair comprising portions of main body diametrically opposite with respect to a longitudinal axis L' and to a transversal axis T', wherein the portions of each pair preferably have the same thickness, and wherein the thickness of one pair is greater than that of the other.

The embodiment of washer 127 of FIG. 52 is particularly suitable for coupling with the connecting element 1', shown in FIG. 2. In the realization of this coupling, the opposition to rotation is achieved through the engagement of two flat and opposed surfaces 134, 135—which partially delimit the through hole 133 inside the washer itself—with the flat walls 3' of the threaded body 1'. In such case, the coupling configuration is such that the washer/threaded body clearance is minimal, as shown for example in the plan view of FIG. 20. The four grooves obtained on the internal walls of the through hole 133 (by way of example, one of the four grooves is denoted by the numerical reference 136 in FIG. 52) are a characteristic optional but preferred of the embodiment described here, since they allow to avoid the washer to jam due to the effect of the tightening torques with the threads sides of the respective threaded body. Preferably, the grooves are arranged between subsequent walls delimiting the opening 133, and have a bevelled profile. In particular, the presence of four walls delimiting the through hole 133, two of which are opposite walls, as already described, are flat, corresponds to the presence of four grooves 136 arranged in the intersection between a wall and the one immediately adjacent.

FIG. 43 shows an even further variant of connecting element, denoted by 1". Such variant provides that the sliding portion, shaped like a groove 48, continues up to the second terminal end portion (the end portion opposite the flange) of the connecting element 1". In other words, the groove 48 extends along the entire length of the connecting element 1".

The groove is in particular configured to allow the insertion, inside thereof, of the interference means of a corresponding washer. In particular, the variant of connecting element 1" is configured to couple with the embodiment of washer 57, bearing a nosepiece 59 integrated projecting within the through hole 58 of the washer itself, as shown in FIGS. 44-46. The coupling achieved is shown in FIG. 47.

The washer 57 is made of a single piece with the nose-piece 59, which performs the function of an anti-rotation pin. The advantage achievable by using the embodiment of washer 57 is that the same can be made by extrusion and subsequent cutting to the desired thickness, with a significant saving in production costs and ease of assembly. Alternatively, the washer can be made by injection molding.

It should further be noted that all the variants described above are liable to be combined with each other, where applicable, and all the elements described can be made in a single piece or as modular bodies to be assembled. The present invention has been hitherto described with reference to preferred embodiments. It should be understood that there may be other embodiments referring to the same inventive core, as defined by the scope of protection of the claims set forth below.

US 12,669,207 B2

15

The invention claimed is:

1. A connection assembly, comprising:
a connecting element suitable for allowing a fluid sealed passage through a wall, said connecting element comprising a main body which has tubular shape and extends according to a longitudinal direction of main development,
said main body having a first terminal end portion and a second terminal end portion mutually opposite along said longitudinal direction, and further comprising a lateral external surface covered and at least partially threaded, wherein said external surface comprises a first region wherein the thread is absent;
a washer comprising:
a second main body having an annular shape, comprising a through hole developing according to said longitudinal direction, wherein said hole is defined by an internal side surface of said second main body configured to engage with said external surface of said connecting element, and
interference components configured to assume:
a rest position, wherein they are at a maximum distance from said second main body and
an operating position, wherein they interfere at least partially with said hole,
wherein said interference components comprise an interference element connected or connectable to said second main body and having a main development direction orthogonal to said longitudinal direction,
wherein said interference element:
has a central region connected or connectable at a first end portion thereof to said second main body and comprises a nosepiece element at a second end portion thereof,
wherein said central region has a facilitated folding portion in such a way as it can be folded to carry said nosepiece from said rest position,
wherein said nosepiece is at a maximum distance from said second main body, to said operating position, wherein said nosepiece interferes at least partially with said hole,
wherein said nosepiece is configured to engage with said first region of said connecting element,
the configuration of said washer being such that said interference components are configured to engage with said first external region of said connecting element and said internal side surface is configured to engage with said external surface of said connecting element when said connecting element is inserted inside said through hole, and
the configuration of said connecting element being such that said first region is configured in such a way as to realize a coupling seal with said nosepiece,

wherein said first region has an at least partially flat extension in extending along said longitudinal direction.

2. The connection assembly according to claim 1, wherein said first region of said connecting element extends from said first terminal end portion, up to half, or ¾, the longitudinal extension of said external surface, while the remaining portion of said external surface at said second terminal end portion is completely threaded.

3. The connection assembly according to claim 1, wherein said connecting element comprises a flange element at said first terminal end portion, said flange element having an oval external profile and a double-curved development with concavity facing towards said second terminal end portion.

4. The connection assembly according to claim 1, wherein said first region of said connecting element is shaped like a groove.

5. The connection assembly according to claim 1, wherein said interference components are movably connected to said second main body.

6. The connection assembly according to claim 1, wherein said central region of said interference element is connected or connectable at a first end portion thereof to an external side surface of said second main body.

7. The connection assembly according to claim 1, wherein said interference element has a substantially rectilinear shape.

8. The connection assembly according to claim 1, wherein said interference element extends on a plane orthogonal to said longitudinal direction when said nosepiece is in said rest configuration.

9. The connection assembly according to claim 1, wherein said central region of said washer comprises a first portion connected to said nosepiece and a second portion connected or connectable to said second main body, wherein said first and second portion are mutually connected at said folding portion facilitated, so that said first portion can be tipped over said second portion to carry said nosepiece in said operating position.

10. The connection assembly according to claim 1, wherein said washer comprises operating elements which can be handled by an operator at said first portion, said operating elements comprising a further through hole that extending in a direction orthogonal to said longitudinal direction when said nosepiece is in said operating position.

11. The connection assembly according to claim 1, wherein said washer has an outer octagonal shaped profile.

12. The connection assembly according to claim 1, wherein said second main body of said washer comprises an upper and/or lower annular surface which has a concave double-curved development.

* * * * *